US012699534B2

(12) United States Patent
Li et al.

(10) Patent No.: US 12,699,534 B2
(45) Date of Patent: Aug. 4, 2026

(54) SOLID STATE DISK READING METHOD AND APPARATUS, DEVICE, AND READABLE STORAGE MEDIUM

(71) Applicant: SUZHOU METABRAIN INTELLIGENT TECHNOLOGY CO., LTD., Suzhou (CN)

(72) Inventors: Dong Li, Suzhou (CN); Jun Su, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/469,949

(22) PCT Filed: Dec. 13, 2024

(86) PCT No.: PCT/CN2024/139279
§ 371 (c)(1),
(2) Date: Sep. 26, 2025

(87) PCT Pub. No.: WO2025/194887
PCT Pub. Date: Sep. 25, 2025

(65) Prior Publication Data
US 2026/0119082 A1     Apr. 30, 2026

(30) Foreign Application Priority Data

Mar. 19, 2024    (CN) .......................... 202410315902.8

(51) Int. Cl.
*G06F 12/00*        (2006.01)
*G06F 3/06*        (2006.01)
(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/061; G06F 3/0679
See application file for complete search history.

(56) References Cited

U.S. PATENT DOCUMENTS 10,877,887 B2 * 12/2020 Jung ................... G06F 12/1009
2016/0283111 A1 * 9/2016 Guo ....................... G06F 3/0655
(Continued)

FOREIGN PATENT DOCUMENTS

CN          107832020 A      3/2018
CN          110991138 A      4/2020
(Continued)

*Primary Examiner* — Shawn X Gu
*Assistant Examiner* — Mohammad S Hasan
(74) *Attorney, Agent, or Firm* — IPro, PLLC

(57) ABSTRACT

The present disclosure provides a solid state disk reading method and apparatus, a device, and a non-volatile readable storage medium. The method comprises: grouping a plurality of logic planes of a logic unit in a solid state disk into a first plane group and a second plane group; assigning a first processing process to the first plane group, and assigning a second processing process to the second plane group; when a first reading request exists in a first message queue of the first processing process and no second reading request exists in a second message queue of the second processing process, sending the first reading request to the solid state disk by means of the first processing process, so as to read data on the solid state disk; and when the first reading request exists in the first message queue of the first processing process and the second reading request exists in the second message queue of the second processing process, sending the first reading request and the second reading request to the solid state disk by means of the first processing process or the second processing process, so as to read the data on the solid state disk.

20 Claims, 8 Drawing Sheets

(56)          References Cited

U.S. PATENT DOCUMENTS

| 2019/0227749 A1* | 7/2019 | Wakchaure | G06F 3/0604 |
|---|---|---|---|
| 2020/0028792 A1 | 1/2020 | Holla et al. | |
| 2022/0083266 A1* | 3/2022 | Prakash | G06F 3/0604 |
| 2023/0229356 A1 | 7/2023 | Madraswala et al. | |

FOREIGN PATENT DOCUMENTS

| CN | 112433672 A | 3/2021 |
|---|---|---|
| CN | 114327280 A | 4/2022 |
| CN | 114546294 A | 5/2022 |
| CN | 115079953 A | 9/2022 |
| CN | 118151851 A | 6/2024 |
| KR | 100626392 B1 | 9/2006 |
| WO | 2021035761 A1 | 3/2021 |

* cited by examiner

| Fourth Logic Plane | | | | read req-uest | preset read duration | data trans-mission | | 301 |
|---|---|---|---|---|---|---|---|---|

| Third Logic Plane | | | read req-uest | preset read duration | data trans-mission | | | 302 |
|---|---|---|---|---|---|---|---|---|

| Second Logic Plane | | read req-uest | preset read duration | data trans-mission | | | | 303 |
|---|---|---|---|---|---|---|---|---|

| First Logic Plane | read req-uest | preset read duration | data trans-mission | | | | | 304 |
|---|---|---|---|---|---|---|---|---|

| Fourth Logic Plane | read req-uest | | preset read durat-ion | | data trans-mission | |
|---|---|---|---|---|---|---|

| Third Logic Plane | read req-uest | | preset read durat-ion | | data trans-mission | |
|---|---|---|---|---|---|---|

| Second Logic Plane | | read req-uest | preset read durat-ion | data trans-mission | | |
|---|---|---|---|---|---|---|

| First Logic Plane | | read req-uest | preset read durat-ion | data trans-mission | | |
|---|---|---|---|---|---|---|

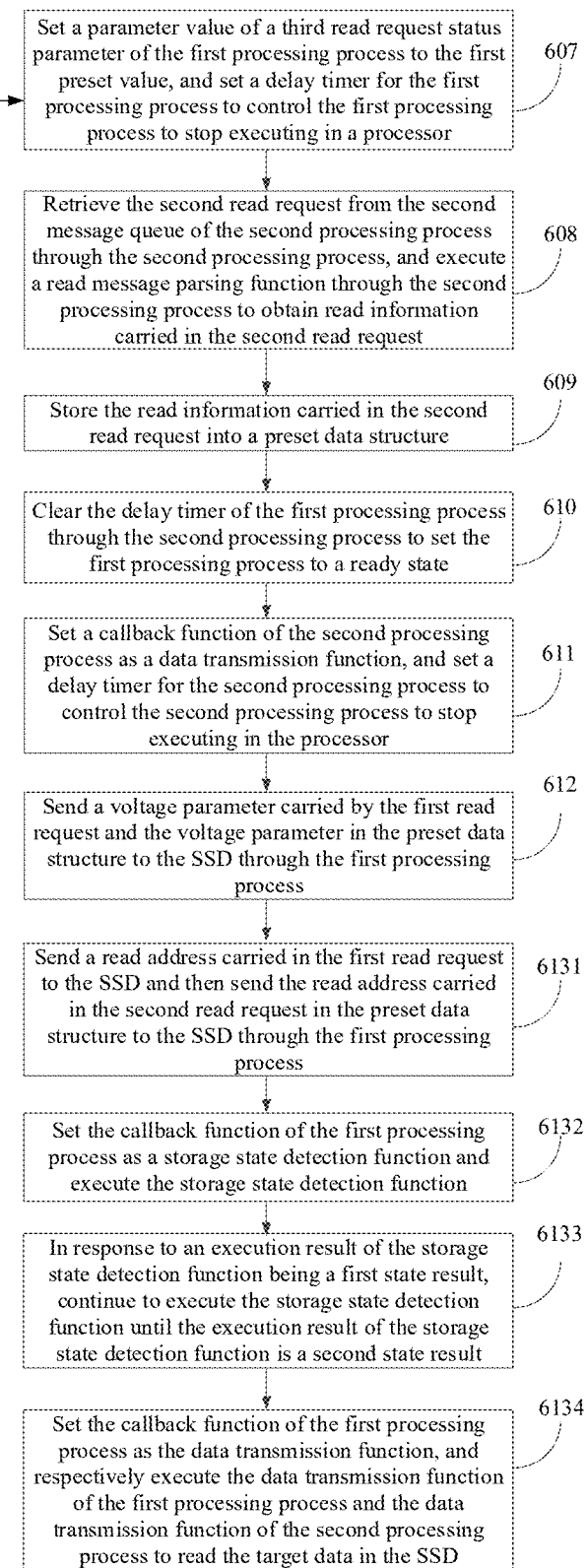

Divide a plurality of logic planes of a LUN in the SSD into a first plane group and a second plane group — 601

Assign a first processing process to the first plane group and assign a second processing process to the second plane group — 602

Read an existence status parameter of the first read request of the first processing process is read, and in response to a parameter value of the existence status parameter of the first read request being a first preset value, determine that there is the first read request in the first message queue of the first processing process — 603

Read an existence status parameter of the second read request of the second processing process, and in response to a parameter value of the existence status parameter of the second read request being a second preset value, determine that there is no second read request in the second message queue of the second processing process — 604

Read an existence status parameter of the first read request of the first processing process, and in response to a parameter value of the existence status parameter of the first read request being a first preset value, determine that there is the first read request in the first message queue of the first processing process — 605

In response to the read existence status parameter of the second read request being a first preset read request sub-parameter, and a parameter value of the first preset read request sub-parameter being the first preset value, determine that there is the second read request in the second message queue of the second processing process — 6061

In response to the read existence status parameter of the second read request read being a second preset read request sub-parameter, and a parameter value of the second preset read request sub-parameter being the first preset value, determine that there is the second read request in the second message queue of the second processing process — 6062

Set a parameter value of a third read request status parameter of the first processing process to the first preset value, and set a delay timer for the first processing process to control the first processing process to stop executing in a processor — 607

Retrieve the second read request from the second message queue of the second processing process through the second processing process, and execute a read message parsing function through the second processing process to obtain read information carried in the second read request — 608

Store the read information carried in the second read request into a preset data structure — 609

Clear the delay timer of the first processing process through the second processing process to set the first processing process to a ready state — 610

Set a callback function of the second processing process as a data transmission function, and set a delay timer for the second processing process to control the second processing process to stop executing in the processor — 611

Send a voltage parameter carried by the first read request and the voltage parameter in the preset data structure to the SSD through the first processing process — 612

Send a read address carried in the first read request to the SSD and then send the read address carried in the second read request in the preset data structure to the SSD through the first processing process — 6131

Set the callback function of the first processing process as a storage state detection function and execute the storage state detection function — 6132

In response to an execution result of the storage state detection function being a first state result, continue to execute the storage state detection function until the execution result of the storage state detection function is a second state result — 6133

Set the callback function of the first processing process as the data transmission function, and respectively execute the data transmission function of the first processing process and the data transmission function of the second processing process to read the target data in the SSD — 6134

FIG. 6

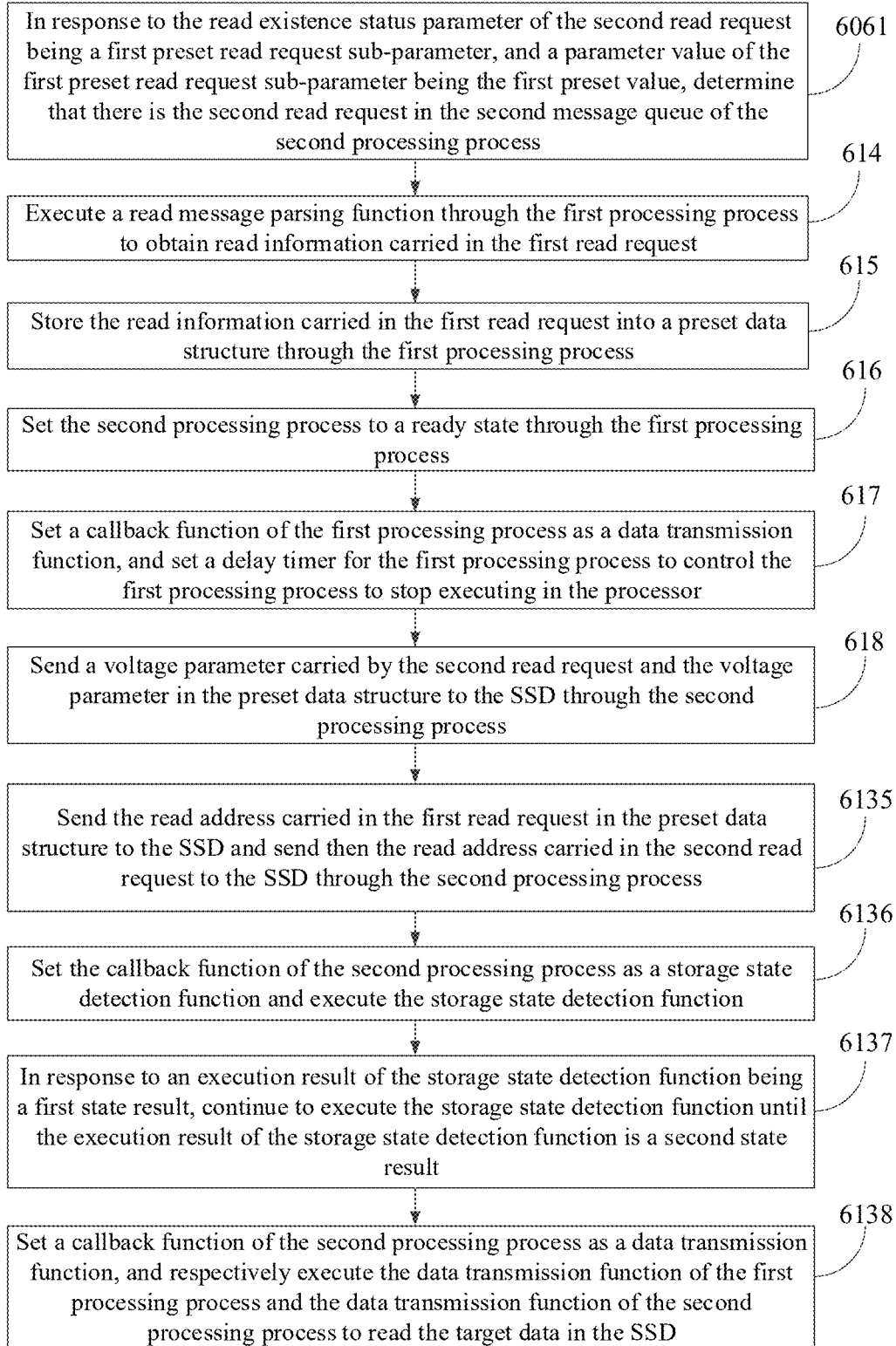

In response to the read existence status parameter of the second read request being a first preset read request sub-parameter, and a parameter value of the first preset read request sub-parameter being the first preset value, determine that there is the second read request in the second message queue of the second processing process — 6061

Execute a read message parsing function through the first processing process to obtain read information carried in the first read request — 614

Store the read information carried in the first read request into a preset data structure through the first processing process — 615

Set the second processing process to a ready state through the first processing process — 616

Set a callback function of the first processing process as a data transmission function, and set a delay timer for the first processing process to control the first processing process to stop executing in the processor — 617

Send a voltage parameter carried by the second read request and the voltage parameter in the preset data structure to the SSD through the second processing process — 618

Send the read address carried in the first read request in the preset data structure to the SSD and send then the read address carried in the second read request to the SSD through the second processing process — 6135

Set the callback function of the second processing process as a storage state detection function and execute the storage state detection function — 6136

In response to an execution result of the storage state detection function being a first state result, continue to execute the storage state detection function until the execution result of the storage state detection function is a second state result — 6137

Set a callback function of the second processing process as a data transmission function, and respectively execute the data transmission function of the first processing process and the data transmission function of the second processing process to read the target data in the SSD — 6138

FIG. 7

SOLID STATE DISK READING METHOD AND APPARATUS, DEVICE, AND READABLE STORAGE MEDIUM

CROSS-REFERENCE TO RELATED APPLICATION

The present disclosure claims the priority of Chinese patent application filed on Mar. 19, 2024 before the CNIPA, China National Intellectual Property Administration with the application number of 202410315902.8, and the title of "METHOD, APPARATUS FOR READING SOLID STATE DISK, DEVICE AND READABLE STORAGE MEDIUM", which is incorporated herein in its entirety by reference.

FIELD

The present disclosure relates to the field of computer technology, and more particularly to a method and an apparatus for reading a solid state disk, an electronic device, and a computer non-volatile readable storage medium.

BACKGROUND

In a solid state disk (SSD), a non-volatile memory device (NAND) flash memory can be used to store data. Data of the SSD can be read through a logic unit (LUN) of the NAND flash memory. There are a plurality of logic planes on the LUN, and data can be read for each logic plane.

At present, in order to improve a reading efficiency when a reading pressure is high, the plurality of logic planes on the LUN are read at the same time, and reading operations on respective logic planes need to be performed at the same time.

However, in the current solution, when the read pressure is relatively low, there are not many cases where the plurality of logic planes need to be read at the same time. Therefore, in order to meet the requirement of reading the plurality of logic planes at the same time, it is necessary to wait for all logic planes to have read requests, which leads to a decrease in reading performance.

SUMMARY

An embodiment of the present disclosure provides a method and an apparatus for reading a solid state disk, an electronic device, and a non-volatile readable storage medium, so as to solve the problem that in the prior art, reading performance is reduced due to waiting for all logical surfaces to have read requests.

In a first aspect, an embodiment of the present disclosure provides a method for reading a solid state disk, including:

dividing a plurality of logic planes of a logic unit in the solid state disk into a first plane group and a second plane group;

assigning a first processing process to the first plane group and a second processing process to the second plane group, where the first processing process is configured to perform data reading of logic planes in the first plane group, and the second processing process is configured to perform data reading of logic planes in the second plane group;

in response to there being a first read request in a first message queue of the first processing process and no second read request in a second message queue of the second processing process, sending the first read request to the solid state disk through the first processing process to read data on the solid state disk;

in response to there being the first read request in the first message queue of the first processing process and the second read request in the second message queue of the second processing process, sending the first read request and the second read request to the solid state disk through the first processing process or the second processing process to read the data on the solid state disk.

In an embodiment, before in response to there being the first read request in the first message queue of the first processing process and no second read request in the second message queue of the second processing process, the method further includes:

reading an existence status parameter of the first read request of the first processing process, and in response to a parameter value of the existence status parameter of the first read request being a first preset value, determining that there is the first read request in the first message queue of the first processing process; and reading an existence status parameter of the second read request of the second processing process, and in response to a parameter value of the existence status parameter of the second read request being a second preset value, determining that there is no second read request in the second message queue of the second processing process.

In an embodiment, before in response to there being the first read request in the first message queue of the first processing process and the second read request in the second message queue of the second processing process, the method further includes:

reading an existence status parameter of the first read request of the first processing process, and in response to a parameter value of the existence status parameter of the first read request being a first preset value, determining that there is the first read request in the first message queue of the first processing process; and reading an existence status parameter of the second read request of the second processing process, and in response to a parameter value of the existence status parameter of the second read request being the first preset value, determining that there is the second read request in the second message queue of the second processing process.

In an embodiment, reading the existence status parameter of the second read request of the second processing process, and in response to the parameter value of the existence status parameter of the second read request being the first preset value, determining that there is the second read request in the second message queue of the second processing process, includes:

in response to the read existence status parameter of the second read request being a first preset read request sub-parameter, and a parameter value of the first preset read request sub-parameter being the first preset value, determining that there is the second read request in the second message queue of the second processing process;

where the parameter value of the first preset read request sub-parameter is the first preset value, indicating that there is the second read request in the second message queue of the second processing process and the second read request has not been retrieved.

In an embodiment, reading the existence status parameter of the second read request of the second processing process, and in response to the parameter value of the existence status parameter of the second read request being the first preset value, determining that there is the second read request in the second message queue of the second processing process, includes:

in response to the read existence status parameter of the second read request read being a second preset read request sub-parameter, and a parameter value of the second preset read request sub-parameter being the first preset value, determining that there is the second read request in the second message queue of the second processing process;

where the parameter value of the second preset read request sub-parameter is the first preset value, indicating that the second read request in the second message queue of the second processing process has been retrieved and has not been executed.

In an embodiment, before sending the first read request and the second read request to the solid state disk through the first processing process or the second processing process, the method further includes:

setting a parameter value of a third read request status parameter of the first processing process to the first preset value, and setting a delay timer for the first processing process to control the first processing process to stop executing in a processor, where the parameter value of the third read request status parameter is the first preset value, indicating that the first read request has been retrieved and has not been executed;

retrieving the second read request from the second message queue of the second processing process through the second processing process, and executing a read message parsing function through the second processing process to obtain read information carried in the second read request;

storing the read information carried in the second read request into a preset data structure, where the read information includes a read address configured to indicate a storage location of data to be read in the solid state disk;

clearing the delay timer of the first processing process through the second processing process to set the first processing process to a ready state, where the ready state indicates that the first processing process is in an executable state; and setting a callback function of the second processing process as a data transmission function, and setting a delay timer for the second processing process to control the second processing process to stop executing in the processor.

In an embodiment, before sending the first read request and the second read request to the solid state disk through the first processing process or the second processing process, the method further includes:

executing a read message parsing function through the first processing process to obtain read information carried in the first read request;

storing the read information carried in the first read request into a preset data structure through the first processing process, where the read information includes a read address;

setting the second processing process to a ready state through the first processing process; and setting a callback function of the first processing process as a data transmission function, and setting a delay timer for the first processing process to control the first processing process to stop executing in a processor.

In an embodiment, sending the first read request and the second read request to the solid state disk through the first processing process or the second processing process to read the data on the solid state disk includes:

sending a read address carried in the first read request to the solid state disk and then sending the read address carried in the second read request in the preset data structure to the solid state disk through the first processing process, where the solid state disk is configured to search for target data according to the read addresses; and setting a callback function of the first processing process as a data transmission function, and respectively executing the data transmission function of the first processing process and the data transmission function of the second processing process to read the target data in the solid state disk.

In an embodiment, sending the first read request and the second read request to the solid state disk through the first processing process or the second processing process to read the data on the solid state disk includes:

sending the read address carried in the first read request in the preset data structure to the solid state disk and then sending a read address carried in the second read request to the solid state disk through the second processing process, where the solid state disk is configured to search for target data according to the read addresses; and setting a callback function of the second processing process as a data transmission function, and respectively executing the data transmission function of the first processing process and the data transmission function of the second processing process to read the target data in the solid state disk.

In an embodiment, before setting the callback function of the first processing process as the data transmission function, the method further includes:

setting the callback function of the first processing process as a storage state detection function and executing the storage state detection function; and in response to an execution result of the storage state detection function being a first state result, continuing to execute the storage state detection function until the execution result of the storage state detection function is a second state result;

where the first state result indicates that the solid state disk is still in a data reading state, and the second state result indicates that the solid state disk has completed data reading.

In an embodiment, before setting the callback function of the second processing process as the data transmission function, the method further includes:

setting the callback function of the second processing process as a storage state detection function and executing the storage state detection function; and in response to an execution result of the storage state detection function being a first state result, continuing to execute the storage state detection function until the execution result of the storage state detection function is a second state result.

In an embodiment, the read information includes a voltage parameter; before sending the read address carried in the first read request through the first processing process, the method further includes:

sending a voltage parameter carried by the first read request and the voltage parameter in the preset data structure to the solid state disk through the first processing process;

where the solid state disk is configured to set a read voltage based on the voltage parameter carried by the first read request and the voltage parameter in the preset data structure.

In an embodiment, the read information includes a voltage parameter; before sending the read address carried in the second read request through the second processing process, the method further includes:

sending a voltage parameter carried by the second read request and the voltage parameter in the preset data structure to the solid state disk through the second processing process;

where the solid state disk is configured to set a read voltage based on the voltage parameter carried by the second read request and the voltage parameter in the preset data structure.

In a second aspect, an embodiment of the present disclosure provides an apparatus for reading a solid state disk, including:

a logic dividing module, configured to divide a plurality of logic planes of a logic unit in the solid state disk into a first plane group and a second plane group;

a processing process module, configured to assign a first processing process to the first plane group and a second processing process to the second plane group, where the first processing process is configured to perform data reading of logic planes in the first plane group, and the second processing process is configured to perform data reading of logic planes in the second plane group;

a separate processing module, configured to in response to there being a first read request in a first message queue of the first processing process and no second read request in a second message queue of the second processing process, execute the first read request through the first processing process to read data on the solid state disk; and a combination processing module, configured to in response to there being the first read request in the first message queue of the first processing process and the second read request in the second message queue of the second processing process, send the first read request and the second read request to the solid state disk through the first processing process or the second processing process to read the data on the solid state disk.

In an embodiment, the apparatus further includes:

a first parameter module, configured to read an existence status parameter of the first read request of the first processing process, and in response to a parameter value of the existence status parameter of the first read request being a first preset value, determine that there is the first read request in the first message queue of the first processing process; and a second parameter module, configured to read an existence status parameter of the second read request of the second processing process, and in response to a parameter value of the existence status parameter of the second read request being a second preset value, determine that there is no second read request in the second message queue of the second processing process.

In an embodiment, the apparatus further includes:

a first request parameter module, configured to read an existence status parameter of the first read request of the first processing process, and in response to a parameter value of the existence status parameter of the first read request being a first preset value, determine that there is the first read request in the first message queue of the first processing process; and a second request parameter module, configured to read an existence status parameter of the second read request of the second processing process, and in response to a parameter value of the existence status parameter of the second read request being the first preset value, determine that there is the second read request in the second message queue of the second processing process.

In an embodiment, the second request parameter module includes:

a first sub-parameter sub-module, configured to in response to the read existence status parameter of the second read request being a first preset read request sub-parameter, and a parameter value of the first preset read request sub-parameter being the first preset value, determine that there is the second read request in the second message queue of the second processing process;

where the parameter value of the first preset read request sub-parameter is the first preset value, indicating that there is the second read request in the second message queue of the second processing process and the second read request has not been retrieved.

In an embodiment, the second request parameter module includes:

a second sub-parameter sub-module, configured to in response to the read existence status parameter of the second read request read being a second preset read request sub-parameter, and a parameter value of the second preset read request sub-parameter being the first preset value, determine that there is the second read request in the second message queue of the second processing process;

where the parameter value of the second preset read request sub-parameter is the first preset value, indicating that the second read request in the second message queue of the second processing process has been retrieved and has not been executed.

In an embodiment, the apparatus further includes:

a first delay execution module, configured to set a parameter value of a third read request status parameter of the first processing process to the first preset value, and set a delay timer for the first processing process to control the first processing process to stop executing in a processor, where the parameter value of the third read request status parameter is the first preset value, indicating that the first read request has been retrieved and has not been executed; and a second request retrieval module, configured to retrieve the second read request from the second message queue of the second processing process through the second processing process, and execute a read message parsing function through the second processing process to obtain read information carried in the second read request;

a first information storage module, configured to store the read information carried in the second read request into a preset data structure, where the read information includes a read address configured to indicate a storage location of data to be read in the SSD;

a first recovery execution module, configured to clear the delay timer of the first processing process through the second processing process to set the first processing process to a ready state, where the ready state indicates that the first processing process is in an executable state; and a second stop execution module, configured to set a callback function of the second processing process as a data transmission function, and set a delay timer for the second processing process to control the second processing process to stop executing in the processor.

In an embodiment, the apparatus further includes:

a first reading module, configured to execute a read message parsing function through the first processing process to obtain read information carried in the first read request;

a second information storage module, configured to store the read information carried in the first read request into a preset data structure through the first processing process, where the read information includes a read address;

a process ready module, configured to set the second processing process to a ready state through the first processing process; and a third stop execution module, configured to set a callback function of the first processing process as a data transmission function, and set a delay timer for the first processing process to control the first processing process to stop executing in a processor.

In an embodiment, the separate processing module includes:

a first data search sub-module, configured to send a read address carried in the first read request to the SSD and then send the read address carried in the second read request in the preset data structure to the SSD through the first processing process, where the SSD is configured to search for target data according to the read addresses; and a first data transmission sub-module, configured to set a callback function of the first processing process as a data transmission function, and respectively executing the data transmission function of the first processing process and the data transmission function of the second processing process to read the target data in the SSD.

In an embodiment, the separate processing module includes:

a second data search sub-module, configured to send the read address carried in the first read request in the preset data structure to the SSD and then send a read address carried in the second read request to the SSD through the second processing process, where the SSD is configured to search for target data according to the read addresses; and a second data transmission sub-module, configured to set a callback function of the second processing process as a data transmission function, and respectively execute the data transmission function of the first processing process and the data transmission function of the second processing process to read the target data in the SSD.

In an embodiment, the apparatus further includes:

a first storage detection module, configured to set the callback function of the first processing process as a storage state detection function and execute the storage state detection function; and a first detection execution module, configured to in response to an execution result of the storage state detection function being a first state result, continue to execute the storage state detection function until the execution result of the storage state detection function is a second state result;

where the first state result indicates that the SSD is still in a data reading state, and the second state result indicates that the SSD has completed data reading.

In an embodiment, the apparatus further includes:

a second storage detection module, configured to set the callback function of the second processing process as a storage state detection function and execute the storage state detection function; and a second detection execution module, configured to in response to an execution result of the storage state detection function being a first state result, continue to execute the storage state detection function until the execution result of the storage state detection function is a second state result.

In an embodiment, the apparatus further includes:

a first voltage sending module, configured to send a voltage parameter carried by the first read request and the voltage parameter in the preset data structure to the SSD through the first processing process;

where the SSD is configured to set a read voltage based on the voltage parameter carried by the first read request and the voltage parameter in the preset data structure.

In an embodiment, the apparatus further includes:

a second voltage sending module, configured to send a voltage parameter carried by the second read request and the voltage parameter in the preset data structure to the SSD through the second processing process;

where the SSD is configured to set a read voltage based on the voltage parameter carried by the second read request and the voltage parameter in the preset data structure.

In a third aspect, an embodiment of the present disclosure provides an electronic device, including a processor, a communication interface, a memory, and a communication bus, where the processor, the communication interface, and the memory communicate with each other through the communication bus;

the memory is configured to store a computer program;

the processor is configured to implement the steps in the method for reading a solid state disk in the first aspect when executing the computer program stored on the memory.

In a fourth aspect, an embodiment of the present disclosure provides a computer non-volatile readable storage medium, which stores a computer program. When the computer program is executed by a processor, the steps in the method for reading a solid state disk in the first aspect is implemented.

Compared with the prior art, the present disclosure has the following advantages:

In the embodiment of the present disclosure, the plurality of logic planes of the LUN in the SSD are divided into the first plane group and the second plane group; the first processing process is assigned to the first plane group and the second processing process is assigned to the second plane group; when there is the first read request in the first message queue of the first processing process and no second read request in the second message queue of the second processing process, the first read request is executed through the first processing process to read the data on the SSD; when there are the first read request in the first message queue of the first processing process and the second read request in the second message queue of the second processing process, the first read request and the second read request are sent through the first processing process or the second processing process to read the data on the SSD. The plurality of logic planes can be grouped, and different logic plane groups correspond to different processing processes. The first read request is directly executed when there is merely the first read request, and the first read request and the second read request are executed through the first processing process or the second processing process when there are both the first read request and the second read request, avoiding the need to wait for read requests of other logic planes when some logic planes already have read requests. That is, it is avoided to have to wait until all logical planes have read requests before data reading can be performed, so that high reading performance can be maintained even under relatively low reading pressure. In addition, the first read request and second read request are sent to the SSD through the first processing process or the second processing process, which allows one processing process to send two read requests at once, instead of each processing process sending a separate read request, further improving the reading performance.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the specific embodiments of the present disclosure are provided below.

BRIEF DESCRIPTION OF THE DRAWINGS

In order to more clearly illustrate technical solutions in the embodiments of the present disclosure or the prior art, the accompanying drawings required for the description of the embodiments will be briefly introduced below.

FIG. 6 is a step diagram of another method for reading a solid state disk provided in an embodiment of the present disclosure.

FIG. 7 is a step diagram of another method for reading a solid state disk provided in an embodiment of the present disclosure.

DETAILED DESCRIPTION

The exemplary embodiments of the present disclosure will be described in more detail below with reference to the accompanying drawings. Although the exemplary embodiments of the present disclosure are shown in the accompanying drawings, it should be understood that the present disclosure may also be implemented in various forms and should not be limited by the embodiments described herein. On the contrary, these embodiments are provided to enable a more thorough understanding of the present disclosure and to fully convey the scope of the present disclosure to those skilled in the art.

Figure 1:
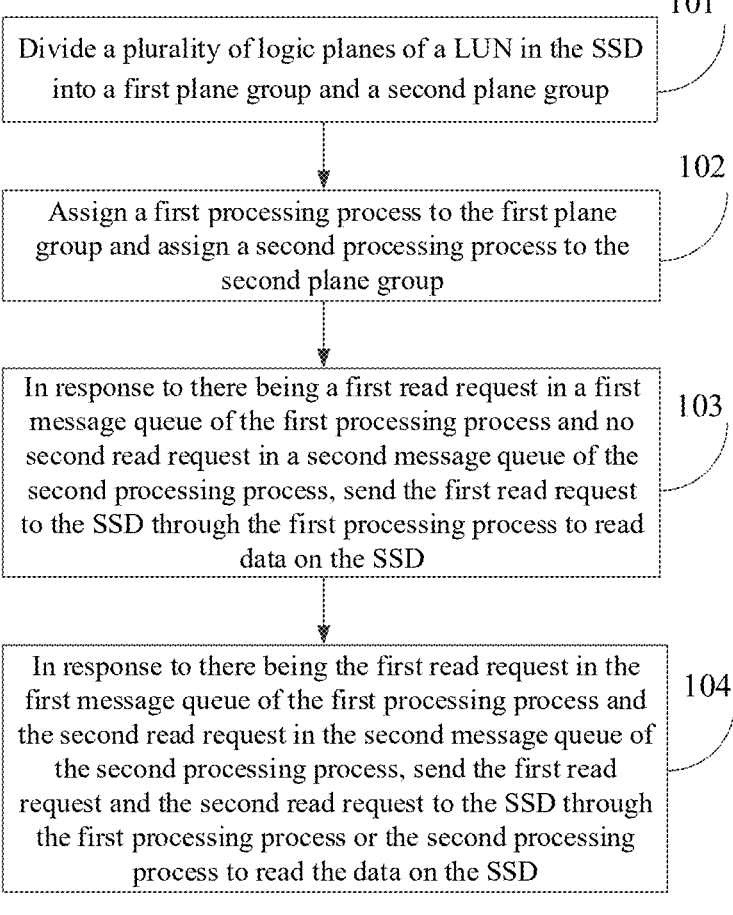
FIG. 1 is a step diagram of a method for reading a solid state disk provided in an embodiment of the present disclosure.

FIG. 1 is a step diagram of a method for reading a solid state disk (SSD) provided in an embodiment of the present disclosure, including steps 101 to 104.

In step 101, a plurality of logic planes of a logic unit (LUN) in the SSD are divided into a first plane group and a second plane group.

Figures 2, 3:
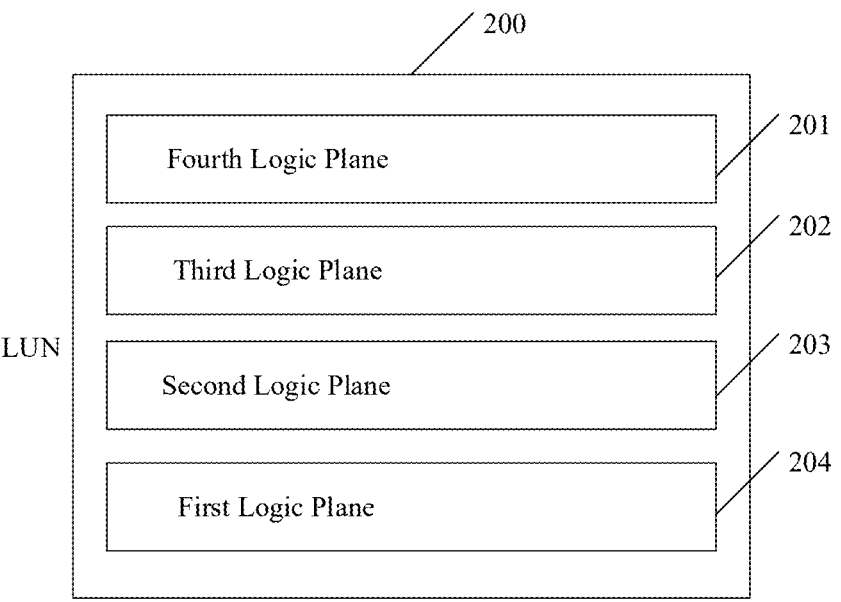
FIG. 2 is a schematic diagram of a logic unit in the solid state disk provided in an embodiment of the present disclosure.
FIG. 3 is a schematic diagram of single-plane read provided in an embodiment of the present disclosure.

FIG. 2 is a schematic diagram of a LUN in the SSD provided in an embodiment of the present disclosure. The LUN 200 includes four logic planes, namely a fourth logic plane 201, a third logic plane 202, a second logic plane 203, and a first logic plane 204. It can be understood that FIG. 2 is merely a schematic of one LUN in the SSD, and the number of logic planes in the LUN can be 4, 6 or more, which is not specifically limited herein.

The ways of reading a non-volatile memory device (NAND) flash memory in the SSD include single-plane read and multi-plane read. When using the single-plane read, for the plurality of logic planes, merely one logic plane can be read at a time, and after data is read, a next logic plane can be read. The time required to read one logic plane at a time is relatively fixed, for example, a preset reading duration. Therefore, when using the single-plane read, if the plurality of logic planes need to be read, several preset reading durations will be required.

As shown in FIG. 3, FIG. 3 is a schematic diagram of single-plane read provided in an embodiment of the present disclosure. Merely one logic plane can be read at a time, and a reading order shown in FIG. 3 is a first logic plane 304, a second logic plane 303, a third logic plane 302, and a fourth logic plane 301.

Figures 4, 5:
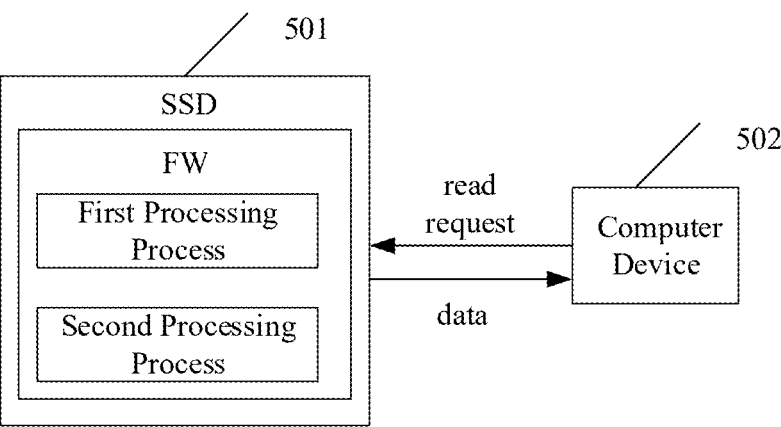
FIG. 4 is a schematic diagram of multi-plane read provided by in an embodiment of the present disclosure.
FIG. 5 is a diagram of an interaction process between a computer device and a solid state disk provided in an embodiment of the present disclosure.

When using the multi-plane read, for the plurality of logic planes, an entire LUN can be used as a concurrent unit. After a preset reading duration, all logic planes in the LUN can be read. As shown in FIG. 4, FIG. 4 is a schematic diagram of multi-plane read provided by in an embodiment of the present disclosure.

It should be noted that a plurality of LUNs are used inside the SSD, especially for a large-capacity disk, which generally has dozens of LUNs, and control logic for each LUN is the same. When a determination is made based on a LUN, if the LUN is in a dormant state, no write or erase operations are in progress.

In an embodiment of the present disclosure, a plurality of logic planes, for example, four logic planes in a LUN can be divided into two groups, namely the first plane group and the second plane group. Continuing to refer to FIG. 4, the first logic plane and the second logic plane can be grouped together, and the third logic plane and the fourth logic plane can be grouped together.

In step 102, a first processing process is assigned to the first plane group and a second processing process is assigned to the second plane group, where the first processing process is configured to perform data reading of logic planes in the first plane group, and the second processing process is configured to perform data reading of logic planes in the second plane group.

In the embodiment of the present disclosure, the first processing process is assigned to the first plane group, and the second processing process is assigned to the second plane group. The processing process can refer to the context (Contex or CTX) which executes commands in firmware (FW) of the SSD. The first processing process performs data reading from the logic planes in the first plane group. Continuing to refer to FIG. 2, for example, when the logic planes in the first plane group are the first logic plane and the second logic plane, data reading for the first logic plane and the second logic plane is performed by the first processing process. When the logic planes in the second plane group are the third logic plane and the fourth logic plane, data reading for the third logic plane and the fourth logic plane is performed by the second processing process.

In step 103, in response to there being a first read request in a first message queue of the first processing process and no second read request in a second message queue of the second processing process, the first read request is sent to the SSD through the first processing process to read data on the SSD.

In an embodiment of the present disclosure, the message queue of the first processing process (referred to as ctx0) is defined as the first message queue (ctx0 msg queue), and the message queue of the second processing process (referred to as ctx1) is defined as the second message queue (ctx1 msg queue). When there is a read request in the first message queue (ctx0 msg queue) and no read request in the second message queue (ctx1 msg queue), it indicates that there is a read request in the first logic plane and/or the second logic plane, and no read request in the third logic plane and the fourth logic plane. In this case, the first read request is executed directly through the first processing process to read the data on the SSD. It can be understood that it is also possible that there is a read request in the second message queue but not in the first message queue, the second read request can be directly executed through the second processing process, and the two processes are the same.

In step 104, in response to there being the first read request in the first message queue of the first processing process and the second read request in the second message queue of the second processing process, the first read request and the second read request are sent to the SSD through the first processing process or the second processing process to read the data on the SSD.

In the embodiment of the present disclosure, when there is the first read request in the first message queue of the first processing process and the second read request in the second message queue of the second processing process, that is, when there are read requests in both the first message queue (ctx0 msg queue) and the second message queue (ctx1 msg queue), the first read request and the second read request can be sent to the SSD through the first processing process or the second processing process to read the data on the SSD. The SSD can find required data based on the read requests and return the data to a device that requests the data, for example, a computer device.

As shown in FIG. 5, FIG. 5 is a diagram of an interaction process between a computer device and a SSD provided in an embodiment of the present disclosure. FW runs in a SSD 501, and there are a first processing process and a second processing process in the FW. A computer device 502 sends read requests to the SSD 501, and then the first processing process or the second processing process returns data to the computer device 502 according to the read requests.

To sum up, in the embodiment of the present disclosure, the plurality of logic planes of the LUN in the SSD are divided into the first plane group and the second plane group; the first processing process is assigned to the first plane group and the second processing process is assigned to the second plane group; when there is the first read request in the first message queue of the first processing process and no second read request in the second message queue of the second processing process, the first read request is executed through the first processing process to read the data on the SSD; when there are the first read request in the first message queue of the first processing process and the second read request in the second message queue of the second processing process, the first read request and the second read request are sent through the first processing process or the second processing process to read the data on the SSD. The plurality of logic planes can be grouped, and different logic plane groups correspond to different processing processes. The first read request is directly executed when there is merely the first read request, and the first read request and the second read request are executed through the first processing process or the second processing process when there are both the first read request and the second read request, avoiding the need to wait for read requests of other logic planes when some logic planes already have read requests. That is, it is avoided to have to wait until all logical planes have read requests before data reading can be performed, so that high reading performance can be maintained even under relatively low reading pressure. In addition, the first read request and second read request are sent to the SSD through the first processing process or the second processing process, which allows one processing process to send two read requests at once, instead of each processing process sending a separate read request, further improving the reading performance.

FIG. 6 is a step diagram of another method for reading a SSD provided the present disclosure.

In step 601, a plurality of logic planes of a LUN in the SSD are divided into a first plane group and a second plane group.

In step 602, a first processing process is assigned to the first plane group and a second processing process is assigned to the second plane group, where the first processing process is configured to perform data reading of logic planes in the first plane group, and the second processing process is configured to perform data reading of logic planes in the second plane group.

The above steps 601-602 can refer to the content of the embodiment in FIG. 1 and will not be repeated here.

In an embodiment, before in response to there being the first read request in the first message queue of the first processing process and no second read request in the second message queue of the second processing process, the method further includes steps 603-604.

In step 603, an existence status parameter of the first read request of the first processing process is read, and in response to a parameter value of the existence status parameter of the first read request being a first preset value, it is determined that there is the first read request in the first message queue of the first processing process.

In step 604, an existence status parameter of the second read request of the second processing process is read, and in response to a parameter value of the existence status parameter of the second read request being a second preset value, it is determined that there is no second read request in the second message queue of the second processing process.

In an embodiment of the present disclosure, the processing processes have a plurality of corresponding status parameters, each of which can indicate the status of the processing process. The existence status parameter of the first read request can be used to indicate whether there is the first read request in the first message queue of the first processing process. The existence status parameter of the first read request can be ctx0_rd_msg_valid. When the parameter value of the existence status parameter of the first read request is the first preset value, for example, ctx0_rd_msg_valid=1, it can be considered that there is the first read request in the first message queue of the first processing process. When the parameter value of the existence status parameter of the first read request is the second preset value, for example, ctx0_rd_msg_valid=0, it can be considered that there is no first read request in the first message queue of the first processing process.

Similarly, the existence status parameter of the second read request of the second processing process can be of the same type as the existence status parameter of the first read request. The existence status parameter of the second read request can be ctx1_rd_msg_valid. If the parameter value of the existence status parameter of the second read request is the second preset value, for example, ctx1_rd_msg_valid=0, it can be determined that there is no second read requests in the second message queue of the second processing process.

In an embodiment, before in response to there being the first read request in the first message queue of the first processing process and the second read request in the second message queue of the second processing process, the method further includes steps 605 and 606.

In step 605, an existence status parameter of the first read request of the first processing process is read, and in response to a parameter value of the existence status parameter of the first read request being a first preset value, it is determined that there is the first read request in the first message queue of the first processing process.

In step 606, an existence status parameter of the second read request of the second processing process is read, and in response to a parameter value of the existence status parameter of the second read request being the first preset value, it is determined that there is the second read request in the second message queue of the second processing process.

In an embodiment of the present disclosure, it is determined that there is the first read request in the first message queue of the first processing process based on the same manner as step 603 above. The existence status parameter of the second read request can be ctx1_rd_msg_valid. If the parameter value of the existence status parameter of the second read request is the first preset value, for example, ctx1_rd_msg_valid=1, it can be known that there is the second read request in the second message queue of the second processing process.

In an embodiment, step 606 may include sub-step 6061.

In step 6061, in response to the read existence status parameter of the second read request being a first preset read request sub-parameter, and a parameter value of the first preset read request sub-parameter being the first preset value, it is determined that there is the second read request in the second message queue of the second processing process.

The parameter value of the first preset read request sub-parameter is the first preset value, indicating that there is the second read request in the second message queue of the second processing process and the second read request has not been retrieved.

In an embodiment of the present disclosure, the existence status parameter of the second read request can include various status parameters. That is, different status parameters can be used as the existence status parameter of the second read request. The existence status parameter of the second read request can be the first preset read request sub-parameter, which can be ctx1_rd_msg_valid. When ctx1_rd_msg_valid=1, it can indicate that there is the second read request in the second message queue of the second processing process and the second read request has not been retrieved. The "retrieved" refers to the processing process retrieving the read request from its own message queue.

In an embodiment, step 606 may include sub-step 6062.

In step 6062, in response to the read existence status parameter of the second read request read being a second preset read request sub-parameter, and a parameter value of the second preset read request sub-parameter being the first preset value, it is determined that there is the second read request in the second message queue of the second processing process.

The parameter value of the second preset read request sub-parameter is the first preset value, indicating that the second read request in the second message queue of the second processing process has been retrieved and has not been executed.

In the embodiment of the present disclosure, the existence status parameter of the second read request can be the second preset read request sub-parameter, which can be ctx1_rd_wait_flag. When the parameter value of the second preset read request sub-parameter is the first preset value, for example, ctx1_rd_wait_flag=1, it can indicate that the second read request in the second message queue of the second processing process has been retrieved and not executed. Not only can it be determined whether there is the second read request in the second message queue, but also the retrieval and execution status of the second read request can be known.

In an embodiment, before sending the first read request and the second read request to the SSD through the first processing process or the second processing process, the method further includes steps 607 to 611.

In step 607, a parameter value of a third read request status parameter of the first processing process is set to the first preset value, and a delay timer is set for the first processing process to control the first processing process to stop executing in a processor, where the parameter value of the third read request status parameter is the first preset value, indicating that the first read request has been retrieved and has not been executed.

In step 608, the second read request is retrieved from the second message queue of the second processing process through the second processing process, and a read message parsing function is executed through the second processing process to obtain read information carried in the second read request.

In step 609, the read information carried in the second read request is stored into a preset data structure, where the read information includes a read address configured to indicate a storage location of data to be read in the SSD.

In step 610, the delay timer of the first processing process is cleared through the second processing process to set the first processing process to a ready state, where the ready state indicates that the first processing process is in an executable state.

In step 611, a callback function of the second processing process is set as a data transmission function, and a delay timer is set for the second processing process to control the second processing process to stop executing in the processor.

In the embodiment of the present disclosure, for steps 607-611, since there is the second read request and the second read request has not been retrieved, the second processing process starts executing so that the second processing process can retrieve the second read request for subsequent data reading. Therefore, it is necessary to set the parameter value of the third read request status parameter of the first processing process to the first preset value, and set the delay timer for the first processing process to control the first processing process to stop executing in the processor. The third read request status parameter can be of the same type as the second preset read request sub-parameter mentioned above. That is, the third read request status parameter can be ctx0_rd_wait_flag. The parameter value of the third read request status parameter is set to the first preset value, that is, ctx0_rd_wait_flag=1, so as to control the first read request to be in a state where it has been retrieved but not executed in the first processing process.

The delay timer is set for the first processing process, so that the first processing process does not have a right to run the processor, for example, a central processing unit (CPU). Through the above two operations, the first processing process is suspended and cannot be executed. It can be understood that operations can also be performed in other ways that prevent the processing process from having the right to run the CPU, which is not specifically limited here.

After the first processing process stops executing, that is, gives up the right to run the CPU, the second processing process can run and retrieve the second read request from the second message queue. The second processing process executes the read message parsing function to parse the second read request and obtain the read information. The read information includes the read address or other information. The read address is used to indicate the storage location of the data to be read in the SSD.

Then, the second processing process can clear the delay timer of the first processing process and set the first processing process to the ready state. The ready state is a state of in a process in an operating system, indicating that the process can start executing but has not actually executed in the CPU.

The callback function of the second processing process is set as the data transmission function, and the delay timer is set for the second processing process to control the second processing process to stop executing in the processor. The callback function is a special type of function, which is passed as a parameter to another function and called after the called function completes its execution. The data transmission function is used to obtain the required data from the SSD.

In addition, it can be understood that data need to be stored after being obtained. Therefore, a data buffer can be allocated in advance, and a status parameter, for example, mpi_read=1, can also be set. The status parameter indicates the operations of steps 607-611 above have been completed. Before sending the subsequent read address, the read address can be sent after reading mpi_read=1.

In an embodiment, the read information includes a voltage parameter; before sending a read address carried in the first read request through the first processing process, the method further includes step 612.

In step 612, a voltage parameter carried by the first read request and the voltage parameter in the preset data structure are sent to the SSD through the first processing process.

The SSD is used to set a read voltage based on the voltage parameter carried by the first read request and the voltage parameter in the preset data structure.

In an embodiment of the present disclosure, there can be a plurality of types of read requests. When some types of read requests need to be processed, such as shift read, a read offset voltage of the NAND needs to be set first so that correct data can be read.

The voltage parameter can be located within the read request, and the read request can be further parsed through the read message parsing function to obtain the voltage parameter. The voltage parameter can be parsed simultaneously with the read address and stored in the preset data structure together with the read address. The first processing process sends the voltage parameter carried by the first read request to the SSD, and sends the voltage parameter in the preset data structure to the SSD. The SSD is used to set the read voltage based on the voltage parameter carried by the first read request and the voltage parameter in the preset data structure.

It can be understood that if a voltage read back check is enabled, after the read voltage is set by the SSD, the read voltage of the SSD can be read and compared with the voltage parameter carried in the first read request and the voltage parameter in the preset data structure, so as to check whether the read voltage of the SSD is consistent with the voltage parameters.

In the embodiment of the present disclosure, the voltage parameter carried by the first read request and the voltage parameter in the preset data structure are sent to the SSD through the first processing process, and the SSD sets the read voltage based on the voltage parameter carried by the first read request and the voltage parameter in the preset data structure. Under the condition that the read requests are a specific type of read requests, a correct reading voltage can be set for the SSD, and the accuracy of data reading is further improved.

In an embodiment, step 613 of sending the first read request and the second read request to the SSD through the first processing process or the second processing process includes step 6131.

In step 6131, a read address carried in the first read request is sent to the SSD and then the read address carried in the second read request in the preset data structure is sent to the SSD through the first processing process, where the SSD is configured to search for target data according to the read addresses.

In this case, since the first processing process is in an executing state and the second processing process is in a stopped executing state, the first processing process sends the read address carried in the first read request to the SSD, and sends the read address carried in the second read request in the preset data structure to the SSD. Similarly, the read address carried in the first read request can also be obtained by the first processing process executing a read message parsing function. The read address carried in the second read request in the preset data structure is parsed and stored by the second processing process in advance. The preset data structure can be mpi_read_var. The preset data structure can include, for example, the read address or other information or parameters.

In an embodiment, before setting a callback function of the first processing process as a data transmission function, the method further includes steps 6132 to 6134.

In step 6132, the callback function of the first processing process is set as a storage state detection function and the storage state detection function is executed.

In step 6133, in response to an execution result of the storage state detection function being a first state result, continue to execute the storage state detection function until the execution result of the storage state detection function is a second state result.

The first state result indicates that the SSD is still in a data reading state, and the second state result indicates that the SSD has completed data reading.

In the embodiment of the present disclosure, after sending the read address carried in the first read request and the read address carried in the second read request to the SSD, it can be understood that the read addresses are included in the read requests. A controller of the SSD can respond to the read requests and read corresponding target data based on the read addresses. The SSD needs to a preset reading duration to read the corresponding target data. Therefore, the callback function of the first processing process needs to be set as the storage state detection function. By executing the storage state detection function, it is determined whether the SSD is still in the data reading state, that is, whether data reading has been completed. After the SSD completes data reading, subsequent data transmission can be performed.

In the embodiment of the present disclosure, the callback function of the first processing process is set as the storage state detection function and the storage state detection function is executed, it is determined whether the SSD has completed data reading according to the execution result of the storage state detection function, avoiding data transmission before the data is completed and improving data integrity.

In step 6134, the callback function of the first processing process is set as the data transmission function, and the data transmission function of the first processing process and the data transmission function of the second processing process are respectively executed to read the target data in the SSD.

In the embodiment of the present disclosure, when detecting whether the SSD has completed data reading, the callback function is the storage state detection function, so the callback function of the first processing process needs to be set as a data transmission function. After setting the callback function of the first processing process as the data transmission function, the callback function of the first processing process and the callback function of the second processing process are both data transmission functions, so that the first processing process and the second processing process can perform their respective data transmission.

FIG. 7 is a step diagram of another method for reading a SSD provided in an embodiment of the present disclosure.

In an embodiment, before sending the first read request and the second read request to the SSD through the first processing process or the second processing process, the method further includes step 614 to 617.

In step 614, a read message parsing function is executed through the first processing process to obtain read information carried in the first read request.

In step 615, the read information carried in the first read request is stored into a preset data structure through the first processing process, where the read information includes a read address.

In step 616, the second processing process is set to a ready state through the first processing process.

In step 617, a callback function of the first processing process is set as a data transmission function, and a delay timer is set for the first processing process to control the first processing process to stop executing in the processor.

In the embodiment of the present disclosure, when the first processing process is in a running state or an executing state, similarly, the first processing process executes the read message parsing function and then stores the obtained read address into the preset data structure. Then the first processing process sets the second processing process to the ready state and sets the callback function of the first processing process as the data transmission function for subsequent data transmission. And the delay timer is set for the first processing process to control the first processing process to stop executing in the processor, so that the second processing process can start running. The specific process will not be elaborated here.

In an embodiment, the read information includes a voltage parameter; before sending a read address carried in the second read request through the second processing process, the method further includes step 618.

In step 618, a voltage parameter carried by the second read request and the voltage parameter in the preset data structure are sent to the SSD through the second processing process.

The SSD is configured to set a read voltage based on the voltage parameter carried by the second read request and the voltage parameter in the preset data structure.

In the embodiment of the present disclosure, the content of step 618 can refer to the process of step 612 mentioned above, with the difference that the voltage parameter carried by the second read request and the voltage parameter in the preset data structure are sent to the SSD through the second processing process. Other specific processes will not be elaborated here.

In the embodiment of the present disclosure, the voltage parameter carried by the second read request and the voltage parameter of the first read request in the preset data structure are sent to the SSD through the second processing process, and the SSD sets the read voltage based on the voltage parameter carried by the second read request and the voltage parameter in the preset data structure. Under the condition that the read requests are a specific type of read requests, a correct reading voltage can be set for the SSD, and the accuracy of data reading is further improved.

In an embodiment, sending the first read request and the second read request to the SSD through the first processing process or the second processing process to read the data on the SSD includes steps 6135 and 6138.

In step 6135, the read address carried in the first read request in the preset data structure is sent to the SSD and then the read address carried in the second read request is sent to the SSD through the second processing process, where the SSD is configured to search for target data according to the read addresses.

In step 6138, a callback function of the second processing process is set as a data transmission function, and the data transmission function of the first processing process and the data transmission function of the second processing process are respectively executed to read the target data in the SSD.

Similarly, the second processing process first sends the read address carried in the first read request in the preset data structure and then sends the read address carried in the second read request to the SSD. Therefore, the order in which the first processing process sends the read addresses is consistent, that is, both the first processing process and the second processing process can first send the read address of the first read request and then send the read address of the second read request.

Then, the callback function of the second processing process is set as the data transmission function. After setting the callback function of the first processing process as the data transmission function, the callback function of the first processing process and the callback function of the second processing process are both data transmission functions, so that the first processing process and the second processing process can perform their respective data transmission. Since the read address of the first read request and the read address of the second read request may be different, the data reading process is a random read. Therefore, the performance of input/output operations per second (IOPS) in the case of the random read can be improved.

In an embodiment, before setting the callback function of the second processing process as the data transmission function, the method further includes steps 6136 and 6137.

In step 6136, the callback function of the second processing process is set as a storage state detection function and the storage state detection function is executed.

In step 6137, in response to an execution result of the storage state detection function being a first state result, continue to execute the storage state detection function until the execution result of the storage state detection function is a second state result.

In the embodiment of the present disclosure, since the second processing process is in a running state in this case, the callback function of the second processing process is set as the storage state detection function, and the storage state detection function is executed. Similarly, based on whether the execution result of the storage state detection function is the first state result or the second state result, it is determined whether the SSD has completed data reading according to the previously received read addresses.

In the embodiment of the present disclosure, the callback function of the first processing process is set as the storage state detection function and the storage state detection function is executed, it is determined whether the SSD has completed data reading according to the execution result of the storage state detection function, avoiding data transmission before the data is completed and improving data integrity.

Figure 8:
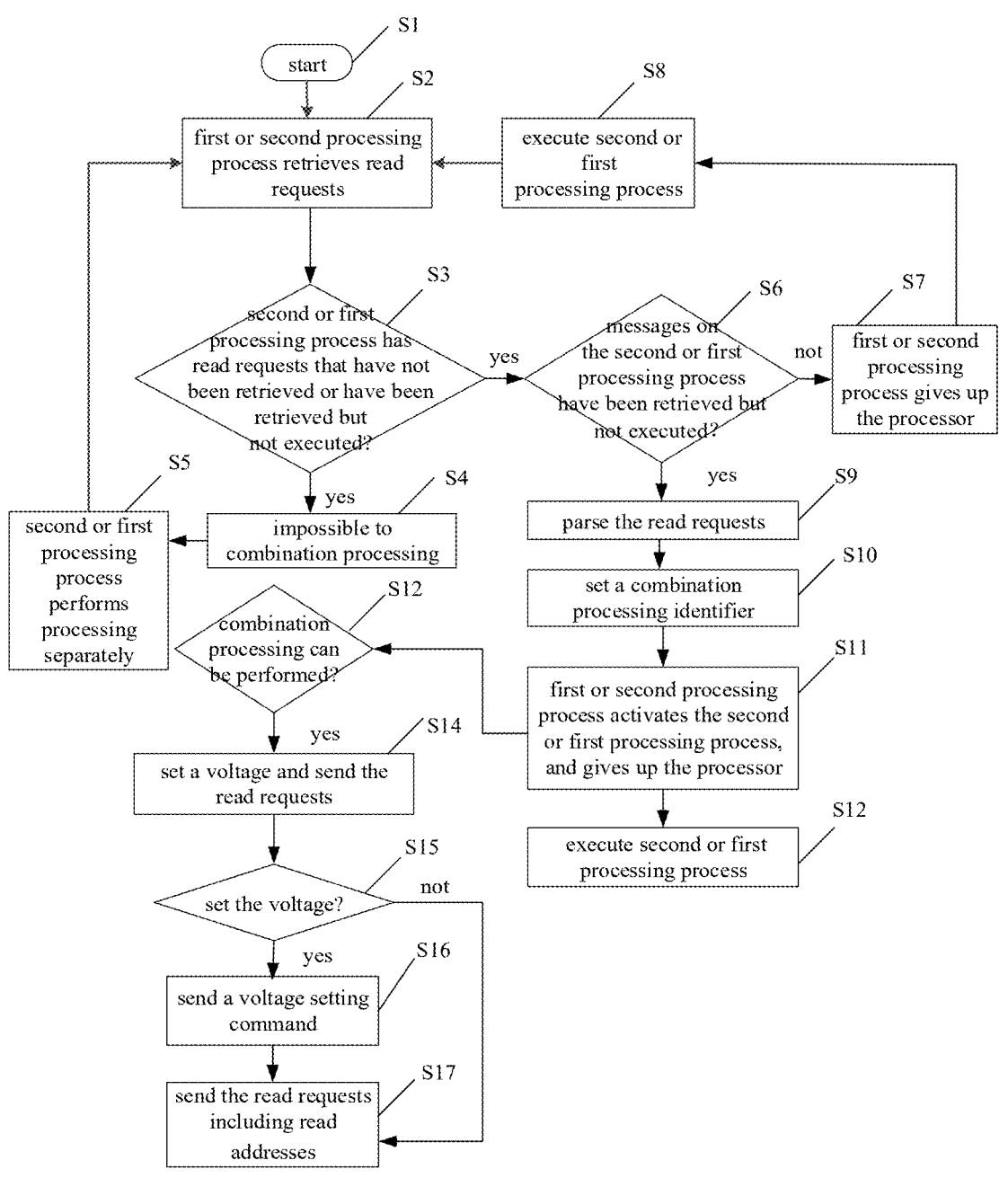
FIG. 8 is a flowchart of determining of merging sending of read requests provided in an embodiment of the present disclosure.

FIG. 8 is a flowchart of determining of merging sending of read requests provided in an embodiment of the present disclosure. FIG. 8 shows a process of determining whether the first read request and the second read request can be sent to the SSD through the first processing process or the second processing process.

In step S1, start; in step S2, the first processing process or the second processing process retrieves read requests; in step S3, whether there are read requests on the second processing process or the first processing process that have not been retrieved or have been retrieved but not executed; in step S4, if the condition is not satisfied that there are read requests on the second processing process or the first processing process that have not been retrieved or have been retrieved but not executed, it is impossible to combination processing, that is, different read requests cannot be processed through one processing process; in step S5, the second processing process or the first processing process performs processing separately; in step S6, if the condition is satisfied that there are read requests on the second processing process or the first processing process that have not been retrieved or have been retrieved but not executed, it is determined whether messages on the second processing process or the first processing process have been retrieved but not executed; in step S7, if the condition of S6 is not satisfied, the first processing process or the second processing process gives up the processor and enters step S8; in step S8, the second processing process or the first processing process is executed; in step S9, if the condition of S6 is satisfied, the read requests are parsed; in step S10, a combination processing identifier is set; in step S11, the first processing process or the second processing process activates the second processing process or the first processing process, and gives up the processor; in step S12, the second processing process or the first processing process is executed; in step S13, it is determined whether combination processing can be performed; in step S14, if the condition for combination processing can be performed is satisfied, a voltage is set and the read requests are sent; in step S15, it is determined whether to set the voltage; in step S16, if the condition for setting the voltage is satisfied, a voltage setting command is sent; in step S17, the read requests including read addresses are sent.

Figure 9:
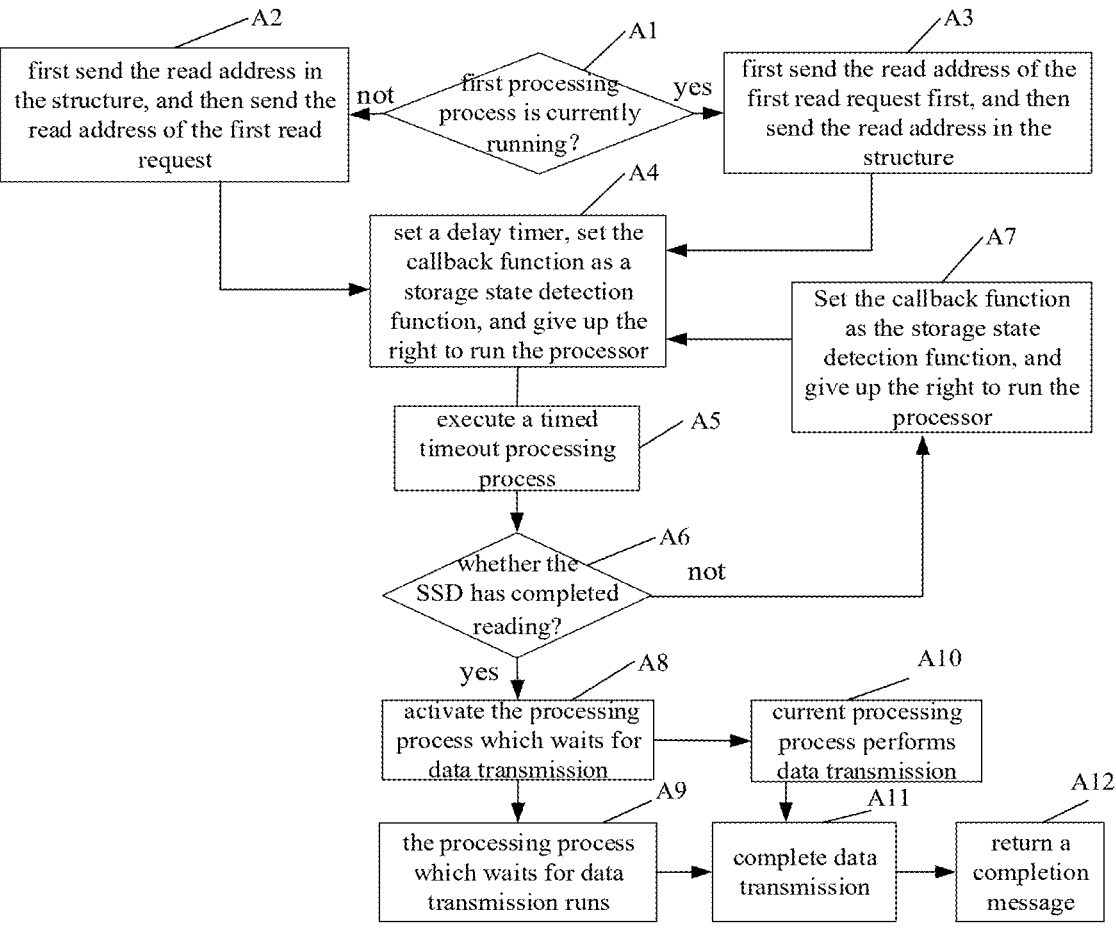
FIG. 9 is a flowchart of read request sending and data transmission provided in an embodiment of the present disclosure.

FIG. 9 is a flowchart of read request sending and data transmission provided in an embodiment of the present disclosure. FIG. 9 shows a process of the first read request and the second read request can be sent to the SSD through the first processing process or the second processing process.

In step A1, which is a continuous step from S17 in FIG. 8, it is determined whether the first processing process is currently running; in step A2, if the first processing process is not running, the read address in the structure is sent first, and then the read address of the first read request is sent; in step A3, if the first processing process is running, the read address of the first read request first is sent first, and then the read address in the structure is sent; in step A4, a delay timer is set, the callback function is set as a storage state detection function, and the right to run the processor is given up; in step A5, a timed timeout processing process is executed; in step A6, it is determined whether the SSD has completed reading; in step A7, if the SSD has not completed reading, the callback function is set as the storage state detection function, and the right to run the processor is given up; in step A8, if the SSD has completed reading, the processing process which waits for data transmission is activated; in step A9, the processing process which waits for data transmission runs; in step A10, the current processing process performs data transmission; in step A11, data transmission is completed; in step A12, a completion message is returned.

To sum up, in the embodiment of the present disclosure, the plurality of logic planes of the LUN in the SSD are divided into the first plane group and the second plane group; the first processing process is assigned to the first plane group and the second processing process is assigned to the second plane group; when there is the first read request in the first message queue of the first processing process and no second read request in the second message queue of the second processing process, the first read request is executed through the first processing process to read the data on the SSD; when there are the first read request in the first message queue of the first processing process and the second read request in the second message queue of the second processing process, the first read request and the second read request are sent through the first processing process or the second processing process to read the data on the SSD. The plurality of logic planes can be grouped, and different logic plane groups correspond to different processing processes. The first read request is directly executed when there is merely the first read request, and the first read request and the second read request are executed through the first processing process or the second processing process when there are both the first read request and the second read request, avoiding the need to wait for read requests of other logic planes when some logic planes already have read requests. That is, it is avoided to have to wait until all logical planes have read requests before data reading can be performed, so that high reading performance can be maintained even under relatively low reading pressure. In addition, the first read request and second read request are sent to the SSD through the first processing process or the second processing process, which allows one processing process to send two read requests at once, instead of each processing process sending a separate read request, further improving the reading performance.

Figure 10:
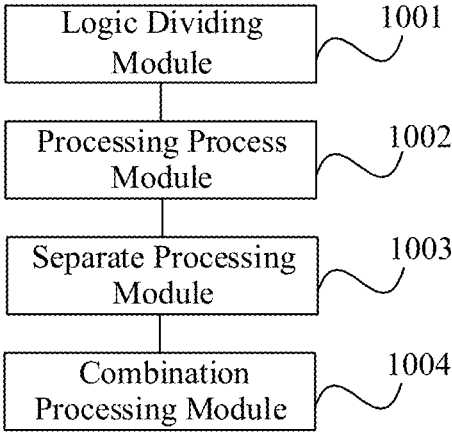
FIG. 10 is a schematic diagram of an apparatus for reading a solid state disk provided in an embodiment of the present disclosure.

FIG. 10 is a schematic diagram of an apparatus for reading a SSD provided in an embodiment of the present disclosure, including:

a logic dividing module 1001, configured to divide a plurality of logic planes of a logic unit (LUN) in the SSD into a first plane group and a second plane group;

a processing process module 1002, configured to assign a first processing process to the first plane group and a second processing process to the second plane group, where the first processing process is configured to perform data reading of logic planes in the first plane group, and the second processing process is configured to perform data reading of logic planes in the second plane group;

a separate processing module 1003, configured to in response to there being a first read request in a first message queue of the first processing process and no second read request in a second message queue of the second processing process, execute the first read request through the first processing process to read data on the SSD; and a combination processing module 1004, configured to in response to there being the first read request in the first message queue of the first processing process and the second read request in the second message queue of the second processing process, send the first read request and the second read request to the SSD through the first processing process or the second processing process to read the data on the SSD.

In an embodiment, the apparatus further includes:

a first parameter module, configured to read an existence status parameter of the first read request of the first processing process, and in response to a parameter value of the existence status parameter of the first read request being a first preset value, determine that there is the first read request in the first message queue of the first processing process; and a second parameter module, configured to read an existence status parameter of the second read request of the second processing process, and in response to a parameter value of the existence status parameter of the second read request being a second preset value, determine that there is no second read request in the second message queue of the second processing process.

In an embodiment, the apparatus further includes:

a first request parameter module, configured to read an existence status parameter of the first read request of the first processing process, and in response to a parameter value of the existence status parameter of the first read request being a first preset value, determine that there is the first read request in the first message queue of the first processing process; and a second request parameter module, configured to read an existence status parameter of the second read request of the second processing process, and in response to a parameter value of the existence status parameter of the second read request being the first preset value, determine that there is the second read request in the second message queue of the second processing process.

In an embodiment, the second request parameter module includes:

a first sub-parameter sub-module, configured to in response to the read existence status parameter of the second read request being a first preset read request sub-parameter, and a parameter value of the first preset read request sub-parameter being the first preset value, determine that there is the second read request in the second message queue of the second processing process;

where the parameter value of the first preset read request sub-parameter is the first preset value, indicating that there is the second read request in the second message queue of the second processing process and the second read request has not been retrieved.

In an embodiment, the second request parameter module includes:

a second sub-parameter sub-module, configured to in response to the read existence status parameter of the second read request read being a second preset read request sub-parameter, and a parameter value of the second preset read request sub-parameter being the first preset value, determine that there is the second read request in the second message queue of the second processing process;

where the parameter value of the second preset read request sub-parameter is the first preset value, indicating that the second read request in the second message queue of the second processing process has been retrieved and has not been executed.

In an embodiment, the apparatus further includes:

a first delay execution module, configured to set a parameter value of a third read request status parameter of the first processing process to the first preset value, and set a delay timer for the first processing process to control the first processing process to stop executing in a processor, where the parameter value of the third read request status parameter is the first preset value, indicating that the first read request has been retrieved and has not been executed; and a second request retrieval module, configured to retrieve the second read request from the second message queue of the second processing process through the second processing process, and execute a read message parsing function through the second processing process to obtain read information carried in the second read request;

a first information storage module, configured to store the read information carried in the second read request into a preset data structure, where the read information includes a read address configured to indicate a storage location of data to be read in the SSD;

a first recovery execution module, configured to clear the delay timer of the first processing process through the second processing process to set the first processing process to a ready state, where the ready state indicates that the first processing process is in an executable state; and a second stop execution module, configured to set a callback function of the second processing process as a data transmission function, and set a delay timer for the second processing process to control the second processing process to stop executing in the processor.

In an embodiment, the apparatus further includes:

a first reading module, configured to execute a read message parsing function through the first processing process to obtain read information carried in the first read request;

a second information storage module, configured to store the read information carried in the first read request into a preset data structure through the first processing process, where the read information includes a read address;

a process ready module, configured to set the second processing process to a ready state through the first processing process; and a third stop execution module, configured to set a callback function of the first processing process as a data transmission function, and set a delay timer for the first processing process to control the first processing process to stop executing in a processor.

In an embodiment, the separate processing module includes:

a first data search sub-module, configured to send a read address carried in the first read request to the SSD and then send the read address carried in the second read request in the preset data structure to the SSD through the first processing process, where the SSD is configured to search for target data according to the read addresses; and a first data transmission sub-module, configured to set a callback function of the first processing process as a data transmission function, and respectively executing the data transmission function of the first processing process and the data transmission function of the second processing process to read the target data in the SSD.

In an embodiment, the separate processing module includes:

a second data search sub-module, configured to send the read address carried in the first read request in the preset data structure to the SSD and then send a read address carried in the second read request to the SSD through the second processing process, where the SSD is configured to search for target data according to the read addresses; and a second data transmission sub-module, configured to set a callback function of the second processing process as a data transmission function, and respectively execute the data transmission function of the first processing process and the data transmission function of the second processing process to read the target data in the SSD.

In an embodiment, the apparatus further includes:

a first storage detection module, configured to set the callback function of the first processing process as a storage state detection function and execute the storage state detection function; and a first detection execution module, configured to in response to an execution result of the storage state detection function being a first state result, continue to execute the storage state detection function until the execution result of the storage state detection function is a second state result;

where the first state result indicates that the SSD is still in a data reading state, and the second state result indicates that the SSD has completed data reading.

In an embodiment, the apparatus further includes:

a second storage detection module, configured to set the callback function of the second processing process as a storage state detection function and execute the storage state detection function; and a second detection execution module, configured to in response to an execution result of the storage state detection function being a first state result, continue to execute the storage state detection function until the execution result of the storage state detection function is a second state result.

In an embodiment, the apparatus further includes:

a first voltage sending module, configured to send a voltage parameter carried by the first read request and the voltage parameter in the preset data structure to the SSD through the first processing process;

where the SSD is configured to set a read voltage based on the voltage parameter carried by the first read request and the voltage parameter in the preset data structure.

In an embodiment, the apparatus further includes:

a second voltage sending module, configured to send a voltage parameter carried by the second read request and the voltage parameter in the preset data structure to the SSD through the second processing process;

where the SSD is configured to set a read voltage based on the voltage parameter carried by the second read request and the voltage parameter in the preset data structure.

To sum up, in the embodiment of the present disclosure, the plurality of logic planes of the LUN in the SSD are divided into the first plane group and the second plane group; the first processing process is assigned to the first plane group and the second processing process is assigned to the second plane group; when there is the first read request in the first message queue of the first processing process and no second read request in the second message queue of the second processing process, the first read request is executed through the first processing process to read the data on the SSD; when there are the first read request in the first message queue of the first processing process and the second read request in the second message queue of the second processing process, the first read request and the second read request are sent through the first processing process or the second processing process to read the data on the SSD. The plurality of logic planes can be grouped, and different logic plane groups correspond to different processing processes. The first read request is directly executed when there is merely the first read request, and the first read request and the second read request are executed through the first processing process or the second processing process when there are both the first read request and the second read request, avoiding the need to wait for read requests of other logic planes when some logic planes already have read requests. That is, it is avoided to have to wait until all logical planes have read requests before data reading can be performed, so that high reading performance can be maintained even under relatively low reading pressure. In addition, the first read request and second read request are sent to the SSD through the first processing process or the second processing process, which allows one processing process to send two read requests at once, instead of each processing process sending a separate read request, further improving the reading performance.

Figure 11:
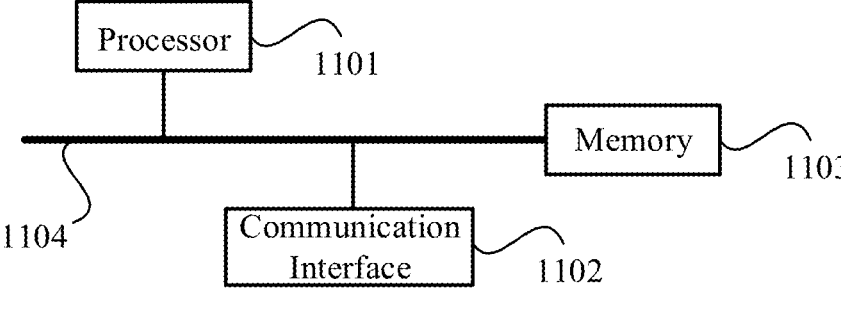
FIG. 11 is a block diagram of an electronic device provided in an embodiment of the present disclosure.

An embodiment of the present disclosure also provides an electronic device. As shown in FIG. 11, the electronic device includes a processor 1101, a communication interface 1102, a memory 1103, and a communication bus 1104, where the processor 1101, the communication interface 1102, and the memory 1103 communicate with each other through the communication bus 1104.

The memory 1103 is used to store a computer program.

The processor 1101 is used to implement the following steps when execute the computer program stored in the memory 1103: dividing a plurality of logic planes of a LUN in the SSD into a first plane group and a second plane group; assigning a first processing process to the first plane group and a second processing process to the second plane group, where the first processing process is configured to perform data reading of logic planes in the first plane group, and the second processing process is configured to perform data reading of logic planes in the second plane group; in response to there being a first read request in a first message queue of the first processing process and no second read request in a second message queue of the second processing process, sending the first read request to the SSD through the first processing process to read data on the SSD; in response to there being the first read request in the first message queue of the first processing process and the second read request in the second message queue of the second processing process, sending the first read request and the second read request to the SSD through the first processing process or the second processing process to read the data on the SSD.

The processor 1101 can also implement other steps in the method for reading a SSD mentioned above, which will not be repeated here.

The communication bus mentioned in the above electronic device can be a peripheral component interconnect (PCI) bus or an extended industry standard architecture (EISA) bus. The communication bus can be divided into address bus, data bus, and control bus. For ease of representation, a thick line is used in the figure, but it does not indicate that there is only one bus or one type of bus.

The communication interface is used for communication between the aforementioned electronic device and other devices.

The memory can include a random access memory (RAM) or a non-volatile memory, such as at least one disk storage. In an embodiment, the memory can also be at least one storage device located far away from the aforementioned processor.

The above processor can be a general-purpose processor, including a central processing unit (CPU) and a network processor (NP). The processor can also be a digital signal processing (DSP), an application specific integrated circuit (ASIC), a field-programmable gate array (FPGA), or other programmable logic devices, discrete gates or transistor logic devices, or discrete hardware components.

In another embodiment provided in the present disclosure, a computer non-volatile readable storage medium is also provided, which stores instructions that, when run on a computer, cause the computer to execute the method for reading a SSD described in the above embodiments.

In another embodiment provided in the present disclosure, a computer program product including instructions is also provided, which, when run on a computer, causes the computer to execute the method for reading a SSD described in the above embodiments.

The above embodiments can be fully or partially implemented through software, hardware, firmware, or any combination thereof. When implemented using software, the embodiments can be fully or partially implemented in the form of a computer program product. The computer program product includes one or more computer instructions. When loading and executing the computer program instructions on a computer, the processes or functions according to the embodiments of the present disclosure are generated in whole or in part. The computer can be a general-purpose computer, a specialized computer, a computer network, or other programmable devices. The computer instructions can be stored in a computer non-volatile readable storage medium or transmitted from a computer non-volatile readable storage medium to another computer non-volatile readable storage. For example, the computer instructions can be transmitted from a website, a computer, a server, or a data center to another website, computer, server, or data center via wired (for example, coaxial cable, optical fiber, digital subscriber line (DSL)) or wireless (for example, infrared, wireless, microwave) means. The computer non-volatile readable storage medium can be any available medium that a computer can access, or a server, data center, or other data storage device that integrates one or more available media. The available media can be magnetic media (for example, floppy disks, hard disks, magnetic tapes), optical media (for example, DVDs), or semiconductor media (for example, solid state disks (SSDs)).

It should also be noted that, relational terms such as "first" and "second" are used herein only to distinguish an entity or operation from another entity or operation, and do not necessarily require or imply any actual relation or order between these entities or operations. Moreover, the terms "comprising", "including" or any other variation thereof are intended to encompass non-exclusive inclusion, so that a process, a method, an article, or a device that includes a set of elements is construed to include not only those elements but also other elements that are not explicitly listed or are inherent to such a process, a method, an article or a device. In absence of further limitations, an element defined by a phrase "includes one." does not preclude the existence of another identical element in a process, a method, an article or a device in which said element is included.

The various embodiments herein are described in a relevant manner, and the same and similar parts between the embodiments can be referred to each other. Each embodiment focuses on the differences from other embodiments. For the embodiments of the apparatus, the electronic device, the computer non-volatile readable storage medium, and the computer program product including instructions, due to their basic similarity to method embodiments, the description is relatively simple. For relevant information, please refer to the description of method embodiments.

The above is merely examples of the present disclosure and is not intended to limit the protection scope of the present disclosure. Any modifications, equivalent substitutions, improvements, etc. made within the spirit and principles of the present disclosure are included within the protection scope of the present disclosure.

The invention claimed is:

1. A method for reading a solid state disk, comprising:
   dividing a plurality of logic planes of a logic unit in the solid state disk into a first plane group and a second plane group;
   assigning a first processing process to the first plane group and a second processing process to the second plane group, wherein the first processing process is configured to perform data reading of logic planes in the first plane group, and the second processing process is configured to perform data reading of logic planes in the second plane group;
   in response to there being a first read request in a first message queue of the first processing process and no second read request in a second message queue of the second processing process, sending the first read request to the solid state disk through the first processing process to read data on the solid state disk;

in response to there being the first read request in the first message queue of the first processing process and the second read request in the second message queue of the second processing process, sending the first read request and the second read request in parallel to the solid state disk through the first processing process or the second processing process to read the data on the solid state disk.

2. The method according to claim 1, wherein before in response to there being the first read request in the first message queue of the first processing process and no second read request in the second message queue of the second processing process, the method further comprises:

reading an existence status parameter of the first read request of the first processing process, and in response to a parameter value of the existence status parameter of the first read request being a first preset value, determining that there is the first read request in the first message queue of the first processing process; and reading an existence status parameter of the second read request of the second processing process, and in response to a parameter value of the existence status parameter of the second read request being a second preset value, determining that there is no second read request in the second message queue of the second processing process.

3. The method according to claim 1, wherein before in response to there being the first read request in the first message queue of the first processing process and the second read request in the second message queue of the second processing process, the method further comprises:

reading an existence status parameter of the first read request of the first processing process, and in response to a parameter value of the existence status parameter of the first read request being a first preset value, determining that there is the first read request in the first message queue of the first processing process; and reading an existence status parameter of the second read request of the second processing process, and in response to a parameter value of the existence status parameter of the second read request being the first preset value, determining that there is the second read request in the second message queue of the second processing process.

4. The method according to claim 3, wherein reading the existence status parameter of the second read request of the second processing process, and in response to the parameter value of the existence status parameter of the second read request being the first preset value, determining that there is the second read request in the second message queue of the second processing process, comprises:

in response to the read existence status parameter of the second read request being a first preset read request sub-parameter, and a parameter value of the first preset read request sub-parameter being the first preset value, determining that there is the second read request in the second message queue of the second processing process;

wherein the parameter value of the first preset read request sub-parameter is the first preset value, indicating that there is the second read request in the second message queue of the second processing process and the second read request has not been retrieved.

5. The method according to claim 3, wherein reading the existence status parameter of the second read request of the second processing process, and in response to the parameter value of the existence status parameter of the second read request being the first preset value, determining that there is the second read request in the second message queue of the second processing process, comprises:

in response to the read existence status parameter of the second read request read being a second preset read request sub-parameter, and a parameter value of the second preset read request sub-parameter being the first preset value, determining that there is the second read request in the second message queue of the second processing process;

wherein the parameter value of the second preset read request sub-parameter is the first preset value, indicating that the second read request in the second message queue of the second processing process has been retrieved and has not been executed.

6. The method according to claim 4, wherein before sending the first read request and the second read request to the solid state disk through the first processing process or the second processing process, the method further comprises:

setting a parameter value of a third read request status parameter of the first processing process to the first preset value, and setting a delay timer for the first processing process to control the first processing process to stop executing in a processor, wherein the parameter value of the third read request status parameter is the first preset value, indicating that the first read request has been retrieved and has not been executed;

retrieving the second read request from the second message queue of the second processing process through the second processing process, and executing a read message parsing function through the second processing process to obtain read information carried in the second read request;

storing the read information carried in the second read request into a preset data structure, wherein the read information comprises a read address configured to indicate a storage location of data to be read in the solid state disk;

clearing the delay timer of the first processing process through the second processing process to set the first processing process to a ready state, wherein the ready state indicates that the first processing process is in an executable state; and setting a callback function of the second processing process as a data transmission function, and setting a delay timer for the second processing process to control the second processing process to stop executing in the processor.

7. The method according to claim 5, wherein before sending the first read request and the second read request to the solid state disk through the first processing process or the second processing process, the method further comprises:

executing a read message parsing function through the first processing process to obtain read information carried in the first read request;

storing the read information carried in the first read request into a preset data structure through the first processing process, wherein the read information comprises a read address;

setting the second processing process to a ready state through the first processing process; and setting a callback function of the first processing process as a data transmission function, and setting a delay timer for the first processing process to control the first processing process to stop executing in a processor.

8. The method according to claim 6, wherein sending the first read request and the second read request to the solid state disk through the first processing process or the second processing process to read the data on the solid state disk comprises:

sending a read address carried in the first read request to the solid state disk and then sending the read address carried in the second read request in the preset data structure to the solid state disk through the first processing process, wherein the solid state disk is configured to search for target data according to the read addresses; and setting a callback function of the first processing process as a data transmission function, and respectively executing the data transmission function of the first processing process and the data transmission function of the second processing process to read the target data in the solid state disk.

9. The method according to claim 7, wherein sending the first read request and the second read request to the solid state disk through the first processing process or the second processing process to read the data on the solid state disk comprises:

sending the read address carried in the first read request in the preset data structure to the solid state disk and then sending a read address carried in the second read request to the solid state disk through the second processing process, wherein the solid state disk is configured to search for target data according to the read addresses; and setting a callback function of the second processing process as a data transmission function, and respectively executing the data transmission function of the first processing process and the data transmission function of the second processing process to read the target data in the solid state disk.

10. The method according to claim 8, wherein before setting the callback function of the first processing process as the data transmission function, the method further comprises:

setting the callback function of the first processing process as a storage state detection function and executing the storage state detection function; and in response to an execution result of the storage state detection function being a first state result, continuing to execute the storage state detection function until the execution result of the storage state detection function is a second state result;

wherein the first state result indicates that the solid state disk is still in a data reading state, and the second state result indicates that the solid state disk has completed data reading.

11. The method according to claim 9, wherein before setting the callback function of the second processing process as the data transmission function, the method further comprises:

setting the callback function of the second processing process as a storage state detection function and executing the storage state detection function; and in response to an execution result of the storage state detection function being a first state result, continuing to execute the storage state detection function until the execution result of the storage state detection function is a second state result.

12. The method according to claim 8, wherein the read information comprises a voltage parameter; before sending the read address carried in the first read request through the first processing process, the method further comprises:

sending a voltage parameter carried by the first read request and the voltage parameter in the preset data structure to the solid state disk through the first processing process;

wherein the solid state disk is configured to set a read voltage based on the voltage parameter carried by the first read request and the voltage parameter in the preset data structure.

13. The method according to claim 9, wherein the read information comprises a voltage parameter; before sending the read address carried in the second read request through the second processing process, the method further comprises:

sending a voltage parameter carried by the second read request and the voltage parameter in the preset data structure to the solid state disk through the second processing process;

wherein the solid state disk is configured to set a read voltage based on the voltage parameter carried by the second read request and the voltage parameter in the preset data structure.

14. The method according to claim 2, wherein the first processing process and the second processing process have a plurality of status parameters indicating status of the processing processes, and the existence status parameter of the first read request is configured to indicate whether there is the first read request in the first message queue of the first processing process.

15. The method according to claim 6, wherein the data transmission function is configured to obtain the data from the solid state disk.

16. The method according to claim 12, wherein after sending the voltage parameter in the preset data structure to the solid state disk, the method further comprises:

reading the read voltage of the solid state disk; and comparing the read voltage with the voltage parameter carried by the first read request and the voltage parameter in the preset data structure to obtain a comparison result.

17. The method according to claim 7, wherein the read message parsing function is configured to parse the first read request to obtain a voltage parameter.

18. An electronic device, comprising:

a memory, configured to store a computer program; and a processor, configured to execute the computer program to implement the method according to claim 1.

19. A computer non-transitory readable storage medium, configured to store a computer program, wherein when the computer program is executed by a processor, the method according to claim 1 is implemented.

20. The electronic device according to claim 18, wherein before in response to there being the first read request in the first message queue of the first processing process and no second read request in the second message queue of the second processing process, the processor is further configured to:

read an existence status parameter of the first read request of the first processing process, and in response to a parameter value of the existence status parameter of the first read request being a first preset value, determine that there is the first read request in the first message queue of the first processing process; and read an existence status parameter of the second read request of the second processing process, and in response to a parameter value of the existence status parameter of the second read request being a second preset value, determine that there is no second read request in the second message queue of the second processing process.

\* \* \* \* \*